(12) United States Patent
Mundhenk et al.

(10) Patent No.: US 9,530,218 B2
(45) Date of Patent: Dec. 27, 2016

(54) METHOD FOR CLASSIFICATION AND SEGMENTATION AND FORMING 3D MODELS FROM IMAGES

(71) Applicant: HRL LABORATORIES LLC, Malibu, CA (US)

(72) Inventors: Terrell N. Mundhenk, Calabasas, CA (US); Heiko Hoffmann, Simi Valley, CA (US); Arturo Flores, La Jolla, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/677,481

(22) Filed: Apr. 2, 2015

(65) Prior Publication Data

US 2015/0287211 A1    Oct. 8, 2015

Related U.S. Application Data

(60) Provisional application No. 61/975,656, filed on Apr. 4, 2014, provisional application No. 61/975,288, filed on Apr. 4, 2014.

(51) Int. Cl.
*G06K 9/34* (2006.01)
*G06T 7/00* (2006.01)

(52) U.S. Cl.
CPC ........... *G06T 7/0081* (2013.01); *G06T 7/0065* (2013.01); *G06T 7/0087* (2013.01); *G06T 2207/20081* (2013.01)

(58) Field of Classification Search
None
See application file for complete search history.

(56) References Cited

U.S. PATENT DOCUMENTS 8,111,923 B2 * 2/2012 Csurka ............... G06K 9/00624
                                                              382/170
8,666,146 B1    3/2014 Smolic et al.
(Continued)

FOREIGN PATENT DOCUMENTS

JP      2007-232593      9/2007
KR   10-2003-0054360    7/2003
KR   10-2005-0001101    1/2005

OTHER PUBLICATIONS

Davis et al., "Filling Holes in Complex Surfaces using Volumetric Diffusion", Proc. First International Symposium on 3D Data Processing, Visualization, Transmission, 11 pages, Padua, Italy, Jun. 19-21, 2002.*

(Continued)

*Primary Examiner* — Feng Niu
(74) *Attorney, Agent, or Firm* — Ladas & Parry

(57) ABSTRACT

A method of classification and segmentation of an image using modules on a computer system includes receiving a plurality of models having features suitable for classifying each pixel of the image into a respective one of a plurality of categories, using a classifier to provide a score for each pixel in the image for each category and using a segmenter to segment the image into image segments, wherein each image segment is a contiguous set of pixels having at least one common feature. For each image segment a set of average probabilities for each category is determined, and for each image segment, a most likely category to which the image segment belongs is determined by the maximum average probability resulting in a labeled segment image, which is used to identify any empty areas as incorrect holes. Then any empty areas that are identified as incorrect holes are filled.

32 Claims, 9 Drawing Sheets

(56) References Cited

U.S. PATENT DOCUMENTS

| | | | |
|---|---|---|---|
| 9,256,803 B2* | 2/2016 | Price | G06K 9/62 |
| 2010/0040285 A1* | 2/2010 | Csurka | G06K 9/00624 |
| | | | 382/170 |
| 2012/0313940 A1 | 12/2012 | Birtwistle et al. | |
| 2014/0079280 A1* | 3/2014 | Price | G06K 9/00771 |
| | | | 382/103 |

OTHER PUBLICATIONS

Pollefeys et al., "Challenges in Wide-area Structure-from-motion", vol. 6, No. 1, pp. 64-79, Mar. 2011.*

J.-M. Frahm, P. Georgel, D. Gallup, T. Johnson, R. Raguram, C. Wu, Y.-H. Jen, E. Dunn, B. Clipp, S. Lazebnik, and M. Pollefeys, "Building Rome on a Cloudless Day," presented at the European Conference on Computer Vision, ECCV 2010, Part IV, LCNS 6314, pp. 368-381.

A. Miller, V. Jain, and J. L. Mundy, "Real-Time Rendering and Dynamic Updating of 3-D Volumetric Data," GPGPU-4 Proceedings of the Fourth Workshop on General Purpose Processing on Graphics Processing Units, 2011, 8pages.

N. Snavely, S. M. Seitz, and R. Szeliski, "Photo Tourism: Exploring Image Collections in 3D.," Proceedings of ACM SIGGRAPH 2006, pp. 835-846.

D. G. Lowe, "Object Recognition From Local Scale-Invariant Features," in Seventh IEEE International Conference on Computer Vision, 1999, vol. 2, pp. 1150-1157.

M. A. Fischler and R. C. Bolles, "Random Sample Consensus: A Paradigm for Model Fitting With Applications to Image Analysis and Automated Cartography," Communications of the ACM, vol. 24, No. 6, pp. 381-395, Jun. 1981.

K. Levenberg, "A Method for the Solution of Certain Non-Linear Problems in Least Squares," Quarterly of Applied Mathematics vol. 2, pp. 164-168, 1944.

Y. Furukawa, B. Curless, S. M. Seitz, and R. Szeliski, "Towards Internet-Scale Multi-View Stereo," IEEE Conference on Computer Vision and Pattern Recognition (CVPR), Jun. 2010, pp. 1434-1441.

M. I. Restrepo, B. A. Mayer, A. O. Ulusoy, and J. L. Mundy, "Characterization of 3-D Volumetric Probabilistic Scenes for Object Recognition," IEEE Journal of Selected Topics in Signal Processing, vol. 6, No. 5, pp. 522-537, Sep. 2012.

B. Clipp, R. Raguram, J.-M. Frahm, G. Welch, and M. Pollefeys, "A Mobile 3D City Reconstruction System," presented at the IEEE VR workshop on Cityscapes,vol. 67, 2008, 4 pages.

C. Wu, B. Clipp, X. Li, J.-M. Frahm, and M. Pollefeys, "3D Model Matching With Viewpoint-Invariant Patches (VIP)," IEEE Conference on Computer Vision and Pattern Recognition, Jun. 2008, pp. 1-8.

A. Vedaldi and B. Fulkerson, "VLFeat: An Open and Portable Library of Computer Vision Algorithms," A Library for Large Linear Classification, The Journal of Machine Learning Research, 9, p. 1871-1874, Jun. 1, 2008.

Y. Singer and N. Srebro, "Pegasos: Primal Estimated sub-GrAdient SOLver for SVM," presented at the Proceedings of the $24^{th}$ International Conference on Machine Learning 2007, 8 pages.

A. Bosch, A. Zisserman, and X. Munoz, "Image Classification Using Random Forests and Ferns," IEEE 11th International Conference on Computer Vision, Oct. 2007, pp. 1-8.

http://coewww.rutgers.edu/riul/research/code/EDISON/.

D. Comaniciu and P. Meer, "Mean Shift: A Robust Approach Towards Feature Space Analysis," IEEE Transactions on Pattern Analysis and Machine Intelligence, vol. 24, No. 5, pp. 603-619, May 2002.

International Search Report and Written Opinion mailed on Jul. 16, 2015 for PCT/US2015/024183.

* cited by examiner

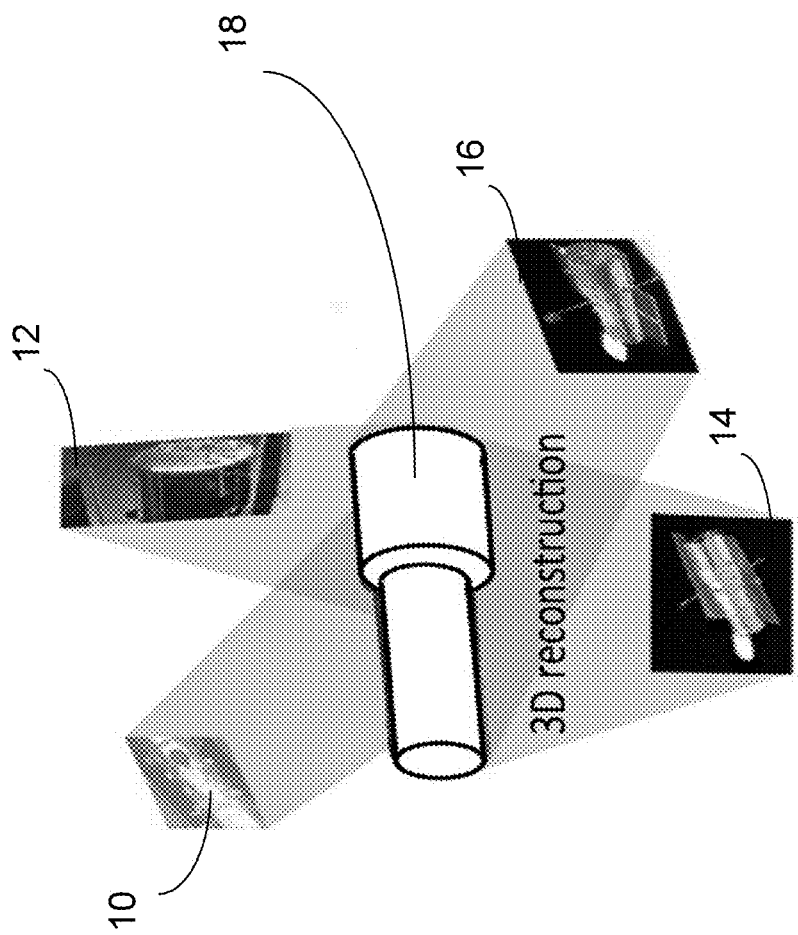

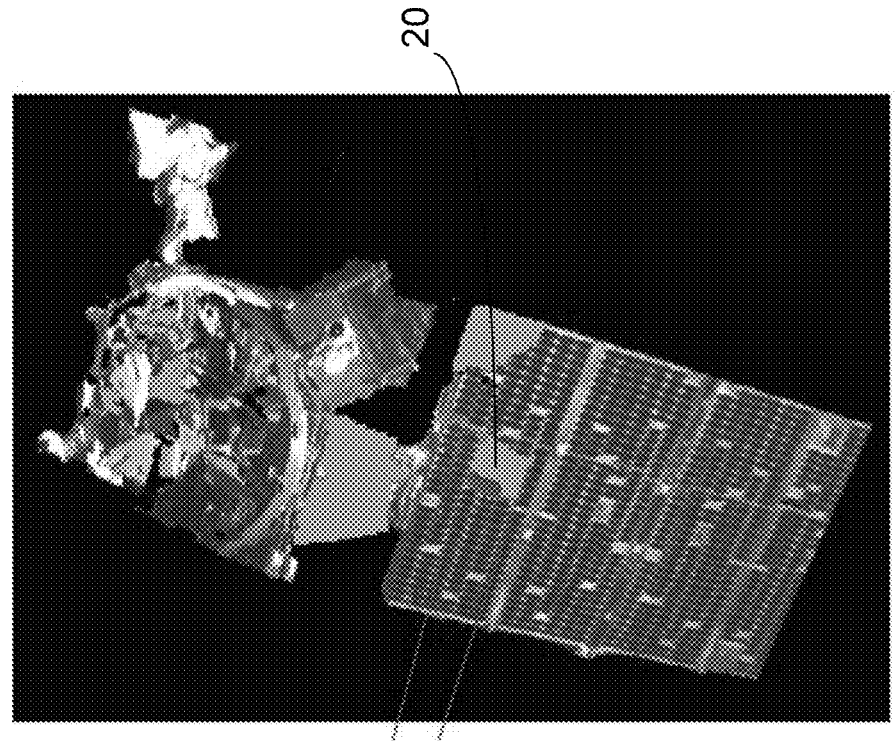
FIG. 2C
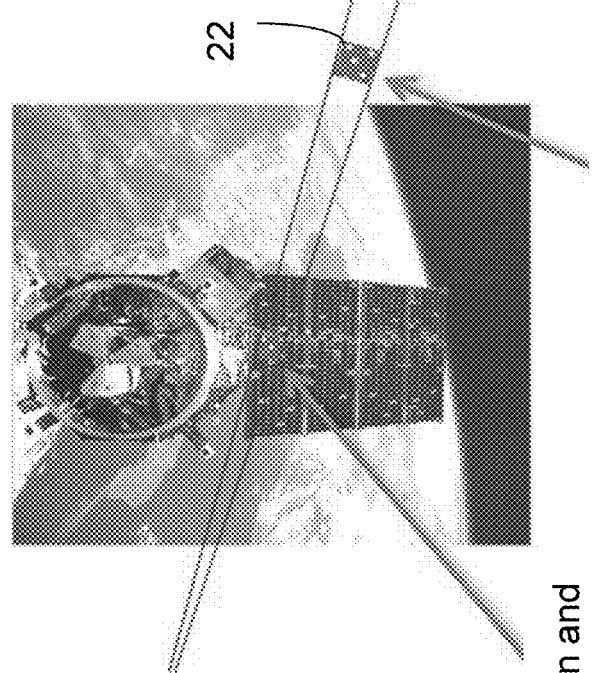
FIG. 2B
FIG. 2A
Classification and Segmentation
Patch to fill missing area in 3D model

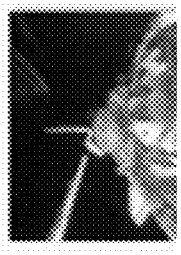
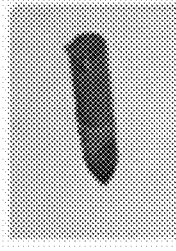
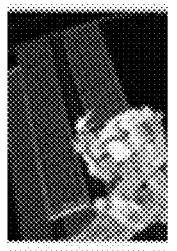
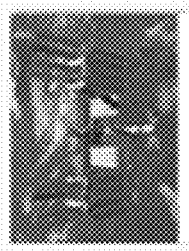
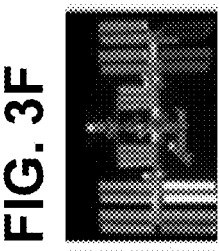
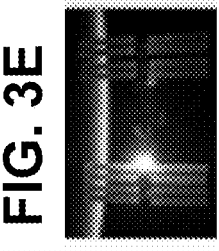
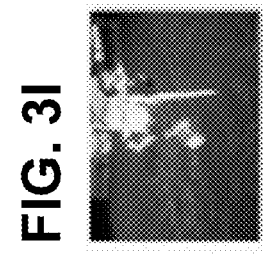
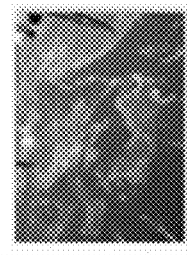
FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L

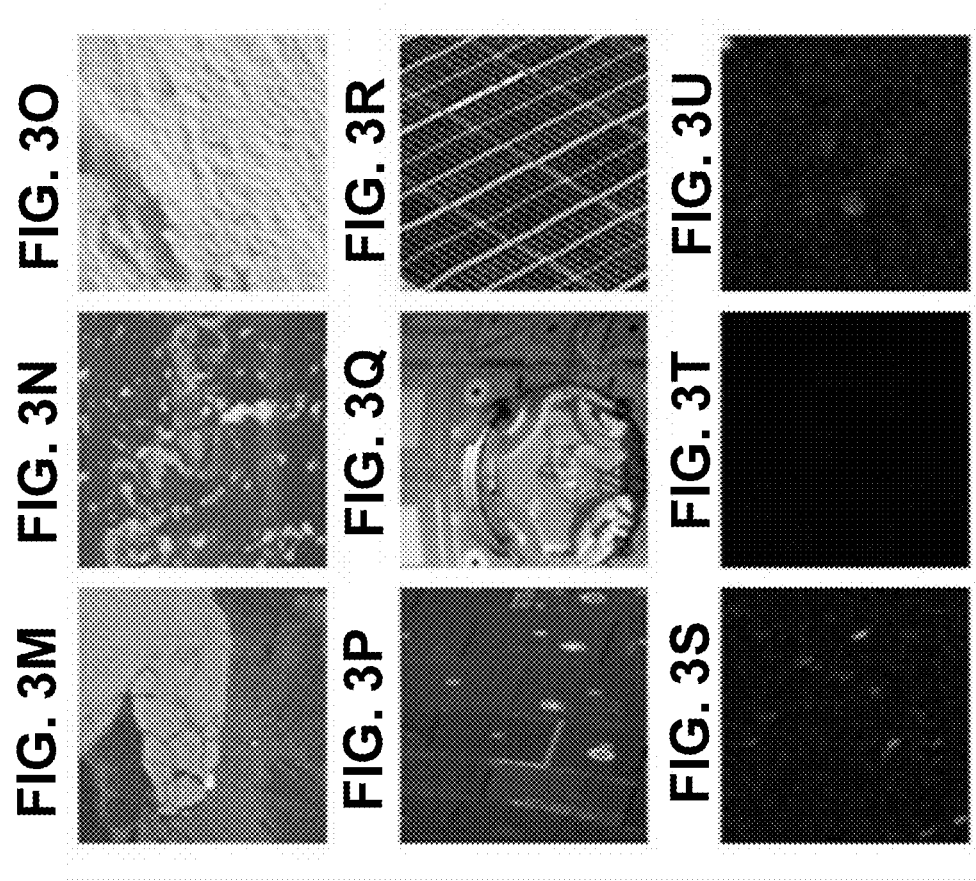

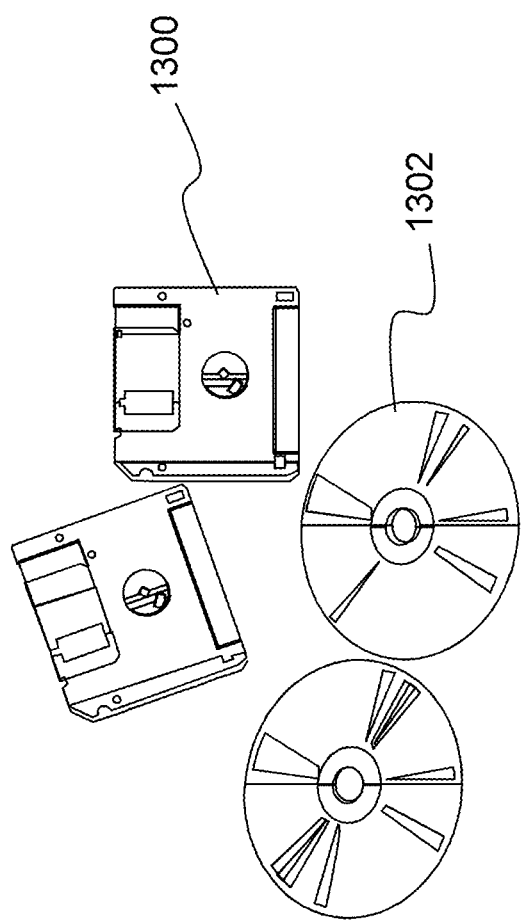

METHOD FOR CLASSIFICATION AND SEGMENTATION AND FORMING 3D MODELS FROM IMAGES

CROSS REFERENCE TO RELATED APPLICATIONS

This application is related to and claims priority from U.S. Provisional Application No. 61/975,656, filed Apr. 4, 2014, and from U.S. Provisional Application No. 61/975,288, filed Apr. 4, 2014, which are incorporated herein by reference as those set forth in full.

STATEMENT REGARDING FEDERAL FUNDING

None.

TECHNICAL FIELD

This disclosure relates to classification and segmentation and three dimensional (3D) reconstructed models generated from a set of images.

BACKGROUND

Reconstructing a three dimensional (3D) model from two dimensional (2D) images is useful for situational awareness, for example, when tele-operating a robot at a distance. Several 2D images can be taken of an object from different angles, such as images 10, 12, 14, and 16 shown in FIG. 1, and then the images can be used to form a 3D reconstruction or 3D model, such as 3D reconstruction 18.

In the prior art, Shape-from-Motion (SFM) approaches create a 3D model by solving for camera poses by matching key features between camera views, as described by N. Snavely, S. M. Seitz, and R. Szeliski in "Photo Tourism: Exploring image collections in 3D" in SIGGRAPH, 2006, which is incorporated herein by reference. These methods can vary by which features are matched, how the pose and perspective problem is solved and how points are filled in between matched key points. A common method is to extract Scale Invariant Feature Transform (SIFT) features, as described by D. G. Lowe in "Object recognition from local scale-invariant features" in the Seventh IEEE International Conference on Computer Vision, 1999, pp. 1150-1157, which is incorporated herein by reference. Then model fitting can be used, as described by M. A. Fischler and R. C. Bolles in "Random sample consensus: a paradigm for model fitting with applications to image analysis and automated cartography," Communications of the ACM, vol. 24, pp. 381-395, 1981, which is incorporated herein by reference, to find inlier matches between images.

A gradient method such as described by K. Levenberg in "A Method for the Solution of Certain Non-Linear Problems in Least Squares," Quarterly of Applied Mathematics vol. 2, pp. 164-168, 1944, which is incorporated herein by reference, may be used to minimize errors in pose and find the transformation matrix that maps key points in one image to another. A series of images can then be bundled together with known camera poses and 3D-mapped key points. Based on the camera poses and key points, a sparse point cloud can be computed, which is useful for matching camera viewpoints; however, it is not visually appealing.

Another method described by Y. Furukawa, B. Curless, S. M. Seitz, and R. Szeliski, "Towards Internet-scale Multi-view Stereo," Computer Vision and Pattern Recognition (CVPR) conference, 2010, which is incorporated herein by reference, can be used to fill in stereo points between the key points as well as perform matching between 3D regions that SFM was unable to connect.

Probabilistic voxel methods are described by A. Miller, V. Jain, and J. L. Mundy in "A heterogeneous Framework for Large-Scale Dense 3-d Reconstruction from Aerial Imagery," IEEE Transactions on Parallel and Distributed Systems, vol. IN PRESS, 2013, and by M. I. Restrepo, B. A. Mayer, A. O. Ulusoy, and J. L. Mundy in "Characterization of 3-D Volumetric Probabilistic Scenes for Object Recognition," IEEE Journal of Selected Topics in Signal Processing, vol. 6, pp. 522-537, 2012, which are incorporated herein by reference. Another method uses surface mapping as described by J.-M. Frahm, P. Georgel, D. Gallup, T. Johnson, R. Raguram, C. Wu, Y.-H. Jen, E. Dunn, B. Clipp, S. Lazebnik, and M. Pollefeys, "Building Rome on a Cloudless Day," presented at the European Conference on Computer Vision (ECCV), 2010, by B. Clipp, R. Raguram, J.-M. Frahm, G. Welch, and M. Pollefeys, "A Mobile 3D City Reconstruction System," presented at the IEEE Vision Recognition (VR) workshop on Cityscapes, 2008, and by C. Wu, B. Clipp, X. Li, J.-M. Frahm, and M. Pollefeys in "3D model matching with viewpoint invariant patches (VIP)," in Computer Vision and Pattern Recognition (CVPR, 2008, which are incorporated herein by reference.

An issue that comes up during the final step of reconstruction is that there are frequently holes in the 3D model. If the surface is visible, this is typically the result of low feature or specular surfaces. However, any optical anomaly that prevents stereo feature matching can be the cause. When these holes are present in the data, the questions then become: when does the hole belong there and when is the hole due to a failure in the 3D constructing software.

FIGS. 2A, 2B and 2C show an example of filling in a hole 20 in a 3D reconstruction shown in FIG. 2C. This may be accomplished by projecting a region 22 of FIG. 2B, as imaged by the camera 24 shown in FIG. 2A, onto the hole 20 in FIG. 2C. To determine what region 22 of FIG. 2B to use to fill the hole 20, classification and segmentation is used.

It is important to be able to accurately identify the parts of an image, such as earth, manmade, or space, in order to form a 3D reconstruction, and to find and fill holes in the 3D reconstruction.

What is needed is an improved method for classification and segmentation of images that can be used to more accurately identify parts of an image and therefore construct a more accurate 3D model. The embodiments of the present disclosure address these and other needs.

SUMMARY

In a first embodiment disclosed herein, a method for providing classification and segmentation of an image on a computer system comprises receiving with a first receiving module on the computer system a two dimensional image having an array of pixels, receiving a plurality of models with a second receiving module on the computer system, each model having features suitable for classifying each pixel of the image into a respective one of a plurality of categories, wherein each category corresponds to a respective model, providing a score for each pixel in the image for each category using a classifier module on the computer system, wherein each score indicates a correspondence of the pixel to one of the plurality of categories, converting each score for each pixel into a probability for each pixel for each category using a conversion module on the computer system, segmenting the image into image segments using a segmenter module on the computer system, wherein each image segment is a contiguous set of pixels having at least one common feature, summing for each image segment the probabilities for each pixel in a respective category in a respective image segment to obtain a sum for each image segment for each category using a summing module on the computer system, dividing each sum by a number of pixels in the respective image segment using a dividing module on the computer system to obtain for each image segment a set of average probabilities, wherein each average probability corresponds to a respective category, determining for each image segment a most likely category to which the image segment belongs using a determining module on the computer system by determining the maximum average probability out of the set of average probabilities for the image segment, labeling using a labeling module on the computer system each image segment as being the category corresponding to the most likely category to form a labeled segment image, identifying any empty areas as incorrect holes in the labeled segment image using an identifying module on the computer system, and filling any empty areas that are identified as incorrect holes using a reconstruction module on the computer system.

In another embodiment disclosed herein, a method of forming a three dimensional model on a computer system comprises receiving a plurality of two dimensional images using a first receiving module on the computer system, each two dimensional image having an array of pixels and being from a respective pose of a target object, receiving a plurality of models using a second receiving module on the computer system, each model having features suitable for classifying each pixel of each two dimensional image into a respective one of a plurality of categories, wherein each category corresponds to a respective model, for each two dimensional image: using a classifier module on the computer system to provide a score for each pixel in the image for each category, wherein each score indicates a correspondence of the pixel to one of the plurality of categories, converting each score for each pixel into a probability for each pixel for each category using a conversion module on the computer system, using a segmenter module on the computer system to segment the image into image segments, wherein each image segment is a contiguous set of pixels having at least one common feature, summing for each image segment using a summer module on the computer system the probabilities for each pixel in a respective category in the respective image segment to obtain a sum for each image segment for each category, dividing using a divider module on the computer system each sum by a number of pixels in the respective image segment to obtain for each image segment a set of average probabilities using a divider module on the computer system, wherein each average probability corresponds to a respective category, determining using a determining module on the computer system for each image segment a most likely category to which the image segment belongs by determining the maximum average probability out of the set of average probabilities for the image segment, and labeling using a labeling module on the computer system each image segment as being the category corresponding to the most likely category to form a labeled segment image, and forming the three dimensional model from the two dimensional images using a three dimension modeling module on the computer system.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 1 shows an example of 3D reconstruction from 2D images in accordance with the present disclosure;

FIGS. 2A, 2B and 2C show an example of filling in a hole in FIG. 2C by projecting a region within the image of FIG. 2B, as imaged by the camera shown in FIG. 2A, onto a hole in the 3D model of FIG. 2C in accordance with the present disclosure;

FIGS. 3A, 3B, 3C, 3D, 3E, 3F, 3G, 3H, 3I, 3J, 3K, and 3L show camera images of the International Space Station (ISS), and from the ISS missions FIGS. 3M, 3N, 3O, 3P, 3Q, 3R, 3S, 3T, and 3U show training patches extracted from the images in accordance with the present disclosure;

FIG. 8 shows storage media in accordance with the present disclosure.

DETAILED DESCRIPTION

Figure 4:
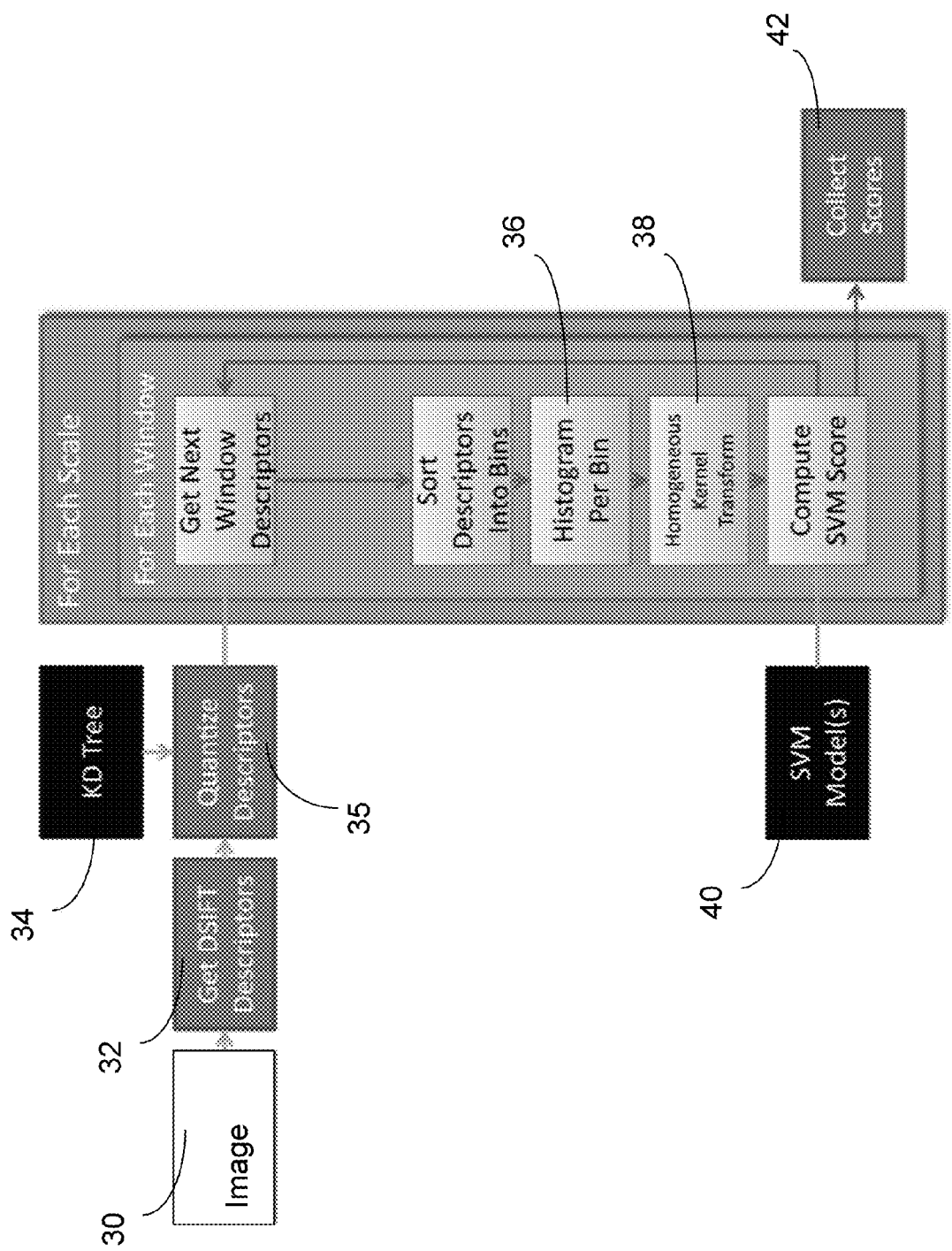
FIG. 4 shows a flow diagram of a method for classification of an image in accordance with the present disclosure.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The method of the present disclosure is of a method of classification and segmentation of an image. In summary the method of the present disclosure learns the features associated with image categories that are of interest. Then blocks within an image are classified by a classifier and given a probability of belonging to any of the image categories. In parallel segmentation is used to find continuous regions in the image having a common feature. The results of classification and segmentation are then combined to identify parts of an image.

Various classification methods may be used; however the classification method must be able to deal with multiple viewpoints and arrangements of features. The classification method must also return a score that can be interpreted as a probability.

The classifier is trained on sets of real images taken from the same class of the target object. For example, if the target object is a spacecraft, the object classification can be trained on a set of images from the International Space Station, as shown in FIGS. 3A, 3B, 3C, 3D, 3E, 3F, 3G, 3H, 3I, 3J, 3K, and 3L. From these images, training patches are extracted. For example, FIGS. 3M, 3N, and 3O are training patches for earth, FIGS. 3P, 3Q, and 3R are training patches of manmade parts of the spacecraft, and FIGS. 3S, 3T, and 3U are training patches for space. These training patches can be used to derive features which can then be used in the classifier to identify whether a part of an image is for example, earth, manmade or space.

There may be a large number of viewpoint and illumination variations, and a classification method is needed that is robust to these variations. A method that is based on feature statistics, but is insensitive to the arrangement of these statistics is preferred. For example, a solar panel contains certain kinds of lines and textures, but these lines and textures can be arranged in many different ways. Additionally, if a solar array is viewed from one angle, lines that run along the array may appear diagonal in the image, while if the solar array is viewed from another angle, the same lines may appear to be horizontal. So, it is best to be less concerned with where features may occur, but more concerned with the statistical composition of features.

A good method for classification of objects is the VLFeat object categorizer, described in A. Vedaldi and B. Fulkerson, "VLFeat: An Open and Portable Library of Computer Vision Algorithms," ed, 2008, which is incorporated herein by reference. VLFeat is open source classification software. The VLFeat object classifier, shown in FIG. 4, works by extracting Pyramid Histogram of Visual Words (PHOW) features 32 from an image 30. PHOW features 32 are a variant of dense Scale Invariant Feature Transform (SIFT) descriptors, extracted at multiple scales in windowed regions of an image, as described by A. Bosch, A. Zisserman, and X. Munoz in "Image classifcation using random forests and ferns" Proc. ICCV, 2007, which is incorporated herein by reference.

A sparse dictionary 35 may be formed by K-means clustering using a K-d Tree 34, as shown in FIG. 4, which is a space-partitioning data structure for organizing points in a k-dimensional space. This dictionary 35 is used to classify the dense SIFT features in a sliding window. Once classified, the classified features per sliding window are counted, which yields a histogram 36 of classified features. Then using a Chi-Squared kernel 38, a support vector machine (SVM) 40 gives the probability of a windowed region being a sample of one of the three categories, such as earth, manmade or space. The SVM 40 may be trained using for example the training patches discussed with reference to FIGS. 3M, 3N, 3O, 3P, 3Q, 3R, 3S, 3T, and 3U. The probability of belonging to each category is derived from a dot product and gives a score 42 that reflects the distance of the histogram 36 to one side or the other from a separating hyper plane. The SVM probability 42 score may have a hyperbolic tangent function applied to it, which forces the probability to range from −1 to 1.

In machine learning, support vector machines (SVMs), such as SVM 40, are supervised learning models with associated learning algorithms that analyze data and recognize patterns, used for classification and regression analysis. Given a set of training examples, each marked as belonging to one of two categories, an SVM training algorithm builds a model that assigns new examples into one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on which side of the gap they fall on. In addition to performing linear classification, SVMs can efficiently perform a non-linear classification using what is called the kernel trick, implicitly mapping their inputs into high-dimensional feature spaces.

The classifier in accordance with the present disclosure works by using a sliding window protocol to determine if a region matches the statistics of training regions. So training involves creating this region classifier. From a set of test images, such as those shown in FIGS. 3A, 3B, 3C, 3D, 3E, 3F, 3G, 3H, 3I, 3J, 3K, and 3L, training images are randomly selected. There may be several thousand 128×128 pixel training images. The randomly selected training images are then inspected and sorted manually into one of the categories of interest, for example, Earth, man-made objects, or space. In a non-limiting example, 9000 training images in all were selected. Using a subset of 6000 of the training images or 2000 per class, the subset of training images are converted into L*a*b color space, which is well known in the art to be the dimension L for lightness and a and b for the color-opponent dimensions, to form training patches, as shown in FIGS. 3M, 3N, 3O, 3P, 3Q, 3R, 3S, 3T, and 3U. Then dense SIFT features are extracted at every other pixel location in each training patch over each of the three color channels. The SIFT descriptor returned may have a standard 128 features per color channel. The color value in L*a*b space is added into the descriptor to add in first order statistics, because color is very revealing in this type of classifier. The color range is then adjusted so that it has the same range as the SIFT features. In all, this returns a feature vector with 387 values. The feature dictionary 35 is created from a random subset of 102400 features over the set of training patches. From this, a dictionary with 1024 feature words is obtained using k-means clustering. Then Kd-tree classifier 34 is formed from the k-means result to reduce dictionary lookup time to log order.

Once the dictionary 35 of features is formed, then the support vector machine classifier is trained. This is done by adding up the number of each feature words in the training patch and normalizing by the total number of words. The histogram 36 created is pre-processed by a Chi-squared kernel 38 and fed into a PEGASOS SVM classifier 40, as described by Y. Singer and N. Srebro, "Pegasos: Primal estimated sub-gradient solver for SVM," presented at the ICML, 2007, which is incorporated herein by reference. Since this is a two-class classifier, an SVM classifier is trained for each class of interest, which yields a fairly simple dot-product classifier for each of the classes with a usable score that allows us to solve the multi-class problem.

FIG. 4 shows a block diagram of the operation of the classifier. The classifier uses a standard sliding window protocol. The sliding window is preferably the same size as the training patches, for example 128×128. Note that because the histogram is normalized, other window sizes may be used. The sliding window is moved in even steps. Step sizes between 16 to 64 pixels of the image 30 have been effective. Smaller steps yield a more precise result, but take longer to compute. Each 128×128 window is classified by the SVM as being one of the trained classes (e.g., Earth, man-made, space). The return is a score 42 and the higher the score is, the stronger the confidence is in the identification. A negative number can be returned for each classifier as well. This signifies the classifier's belief that a patch is not one of the categories.

As discussed above, the score 42, shown in FIG. 4 may be squashed by a tangential sigmoid (hyperbolic tangent) which forces scores to range from −1 to 1. For each training patch, one score for each class is returned. The patch score is stored in an image at the location of the patch in the original image. For example, given an image that is 1525×1904, if a 16-pixel step is used with a 128×128 sized patch, the sliding window protocol will return a score image that is 88×111 with one channel for the score of each class. If the score image is scaled back to the size of the original image, the result is a raw score over the entire image of regions belonging to one class or the other. The score image roughly corresponds to objects in an image. The next step is to translate this rough score image into segments which match more tightly to the actual extent of objects in the image.

Segmentation of the image may be performed using a Mean-Shift segmentation method, as described by EDISON available at URL http://coewww.rutgers.edu/riul/research/code/EDISON/ and by D. Comaniciu and P. Meer, "Mean Shift: A Robust Approach Towards Feature Space Analysis," IEEE Transactions on Pattern Analysis and Machine Intelligence, vol. 24, pp. 1-18, 2002, which are incorporated herein by reference. Other segmentation methods known by those skilled in the art may also be used. For computational efficiency, the size of the raw input images may be reduced to between 15% to 50% of their original size. The segmentation returns a list of labeled regions. For each labeled segment, the mean probability for each of the three classes is found. The maximum probability determines the final classification of that labeled segment. So given n pixels in a segment with the same label l, which indicates a contiguous region in the image, with scores from the sliding window classifier s for each class θ the unnormalized probability for a segment belonging to that class can be loosely expressed as shown in equation (1) below.

$$P(\theta \mid l) = \frac{\sum_{i=0}^{n} s_\theta^i}{n} \quad (1)$$

The class that the segment belongs to is the max of the three P(θ|l) scores. This choice has the effect of smoothing out scores along continuous feature segments and creating reasonable border regions.

Figure 6:
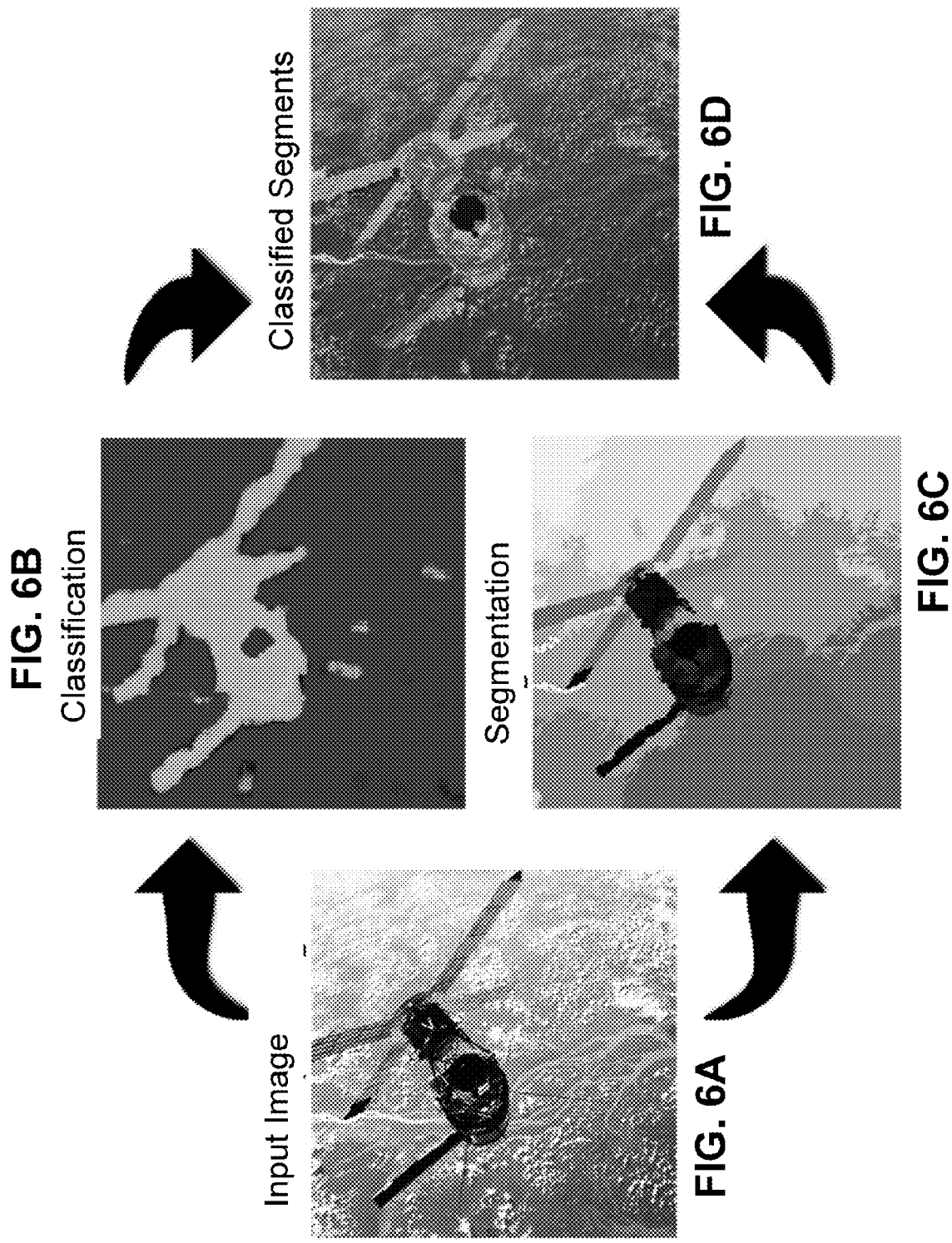
FIGS. 6A, 6B, 6C and 6D show an example 2D image in FIG. 6A, an example classification result in FIG. 6B after classification of the image of FIG. 6A, an example segmentation result in FIG. 6C after segmentation of the image of FIG. 6A, and an example of combining the classification and the segmentation together in FIG. 6D in accordance with the present disclosure.

FIGS. 6A, 6B, 6C and 6D show an example 2D image in FIG. 6A, an example classification result in FIG. 6B after classification of the image of FIG. 6A, an example segmentation result in FIG. 6C after segmentation of the image of FIG. 6A, and an example of combining the classification and the segmentation together in FIG. 6D. The segmentation provides better boundaries for the classification results. A criteria can be applied to the classification results by adding an unknown category if no class scores above a certain threshold. The probability threshold may be set to 0.5.

Figure 5:
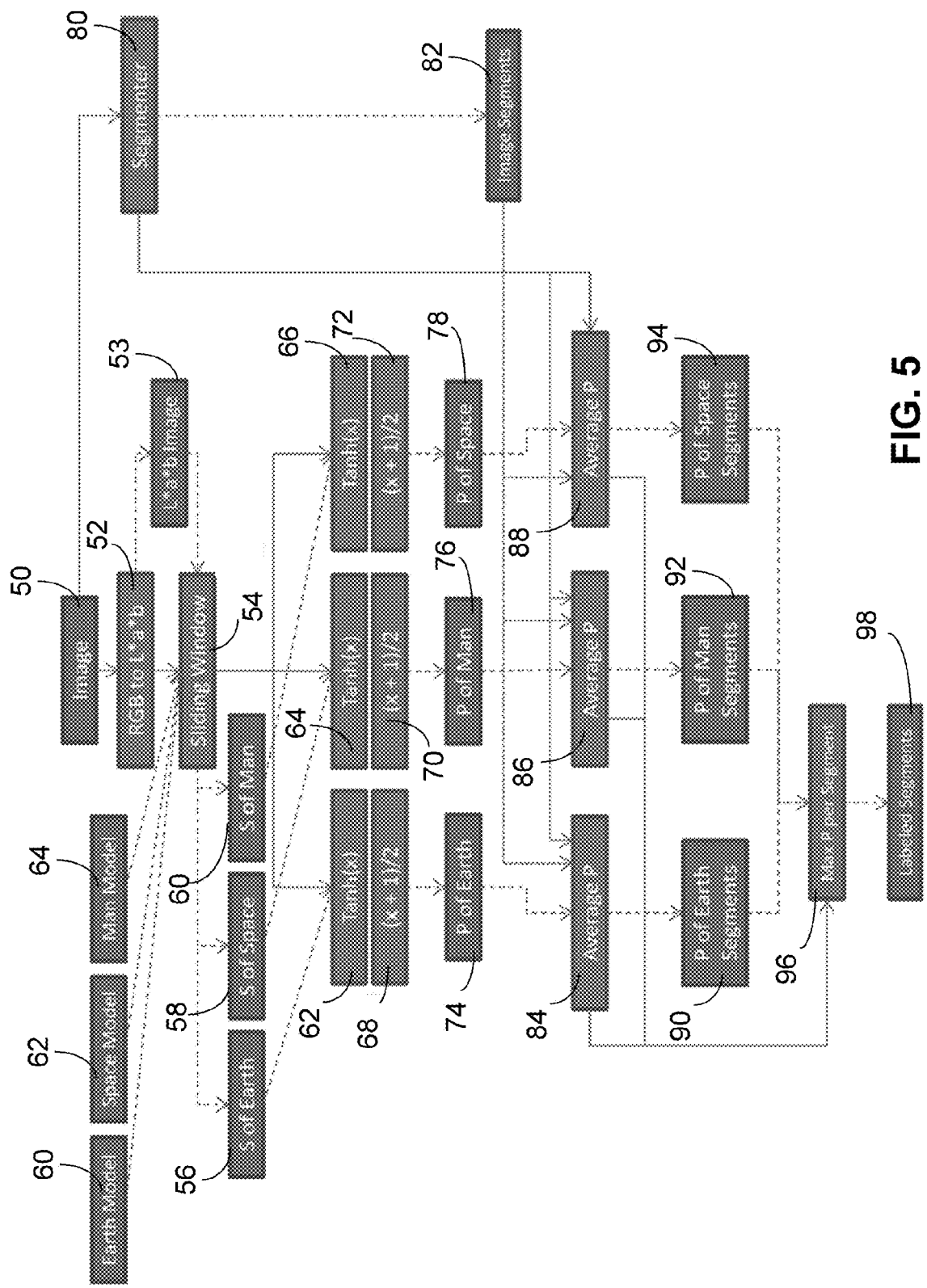
FIG. 5 shows a flow diagram of an image classification and segmentation method in accordance with the present disclosure.

FIG. 5 further describes the method of the present disclosure. An image 50 is first converted from RGB (red, green, blue) to L*a*b space in step 52, to form an L*a*b image 53. Then a sliding window 54 is moved over the image 53. For example, if the image 53 is 1024 by 1024 pixels, a 25×25 pixel sliding window 54 may be used. Then using features from earth model 60, space model 62, and manmade model 64, classification scores 56, 58, and 60 are computed for each position of the sliding window. The classification scores in the example given are a score 56 for earth, a score 58 for space, and a score 60 for manmade. These classification scores may be derived using the classifier described above with reference to FIG. 4, or another classifier that is able to deal with multiple viewpoints and arrangements of features, and that returns a score.

If the sliding window is moved one pixel at a time, then the classification score for a sliding window may be given to the pixel at the center of the sliding window. If the sliding window is moved more than one pixel at a time, then the classification score for a sliding window may be given to a set of pixels near the center of the sliding window.

After the sliding window 54 is slid over all positions of the image 53, and scores for each category for each pixel is obtained, then the output from the sliding window protocol is a set of score images, one score image for each category, for example a score image 56 for earth, a score image 58 of space, and a score image 60 of manmade. The score depends on how well the features seen in image 50 match the earth model 60, space model 62 or manmade model 64. The score image has the same scale as the original image 50.

Then each score image 56, 58, and 60 is conditioned into a probability image by squashing the scores by computing a hyperbolic tangent of the scores in steps 62, 64, and 66, respectively, which converts each score in each score image to a range from −1 to 1, which may be referred to as a squashed score. Then, in steps 68, 70 and 72, a 1 is added to each squashed score then the sum of 1 and each squashed score is divided by 2. This forces each scores to range from 0 to 1, which can be interpreted as a probability. The output is a set of probability images, one for each category, such as probability image 74 for earth, probability image 76 for manmade, and probability image 78 for space.

In parallel, the image 50 is input into a segmenter 80 to produce a segmented image with image segments 82. An image segment 82 is a contiguous set of pixels that have one or more common features, such as a simple feature like color.

Next in step 84, for each image segment 82, the probabilities in the probability image 74 for earth that are in the respective image segment 82 are summed and the sum is then divided by the number of pixels in that respective image segment 82. The output is a segmented probability map 90 for earth. Then in step 86, for each image segment 82, the probabilities in the probability image 76 for manmade that are in the respective image segment 82 are summed and the sum is then divided by the number of pixels in that respective image segment 82. The output is a segmented probability map 92 for manmade. Next 88, for each image segment 82, the probabilities in the probability image 78 for space that are in the respective image segment 82 are summed and the sum is then divided by the number of pixels in that respective image segment 82. The output is a segmented probability map 94 for space. If more categories than earth, space, and manmade were in the classification, then this repeats until all the categories have been processed in the same manner. The described process processes P in equation (1) above, which is shown again below.

$$P(\theta \mid l) = \frac{\sum_{i=0}^{n} s_\theta^i}{n} \quad (2)$$

Then, in step 96, for each image segment in the segmented probability maps 90, 92 and 94, the maximum probability for the image segment is determined. For example if the segmented probability map 92 has a greater P for an image segment than the segmented probability map 90 and the segmented probability map 94 for the same image segment, then the maximum probability is determined to be manmade, and then the segment is give a label as manmade in step 98. However, if all the segmented probability maps 90, 92 and 94 have a probability for an image segment that is less than 0.5, then that image segment is labeled as a category of unknown, since none of the models matched with a positive score. The output is the final labeled segment image 98.

The resulting labeled segment image 98 may be used to assist in the identifications of empty areas in a 3D reconstruction as incorrect holes. Once an area has been determined to have an incorrect hole, several methods may be used to attempt to fill it. For instance, a plane may be projected over the hole and overlayed with an image similar to a surrounding area, as shown in FIG. 2C. A different reconstruction method may also be applied locally although this might be more computationally expensive. For example, a probabilistic voxel method, such as described by A. Miller, V. Jain, and J. L. Mundy, "Real-time rendering and dynamic updating of 3-d volumetric data," in The Fourth Workshop on General Purpose Processing on Graphics Processing Units 2011, which is incorporated herein by reference, may be used.

Figure 7:
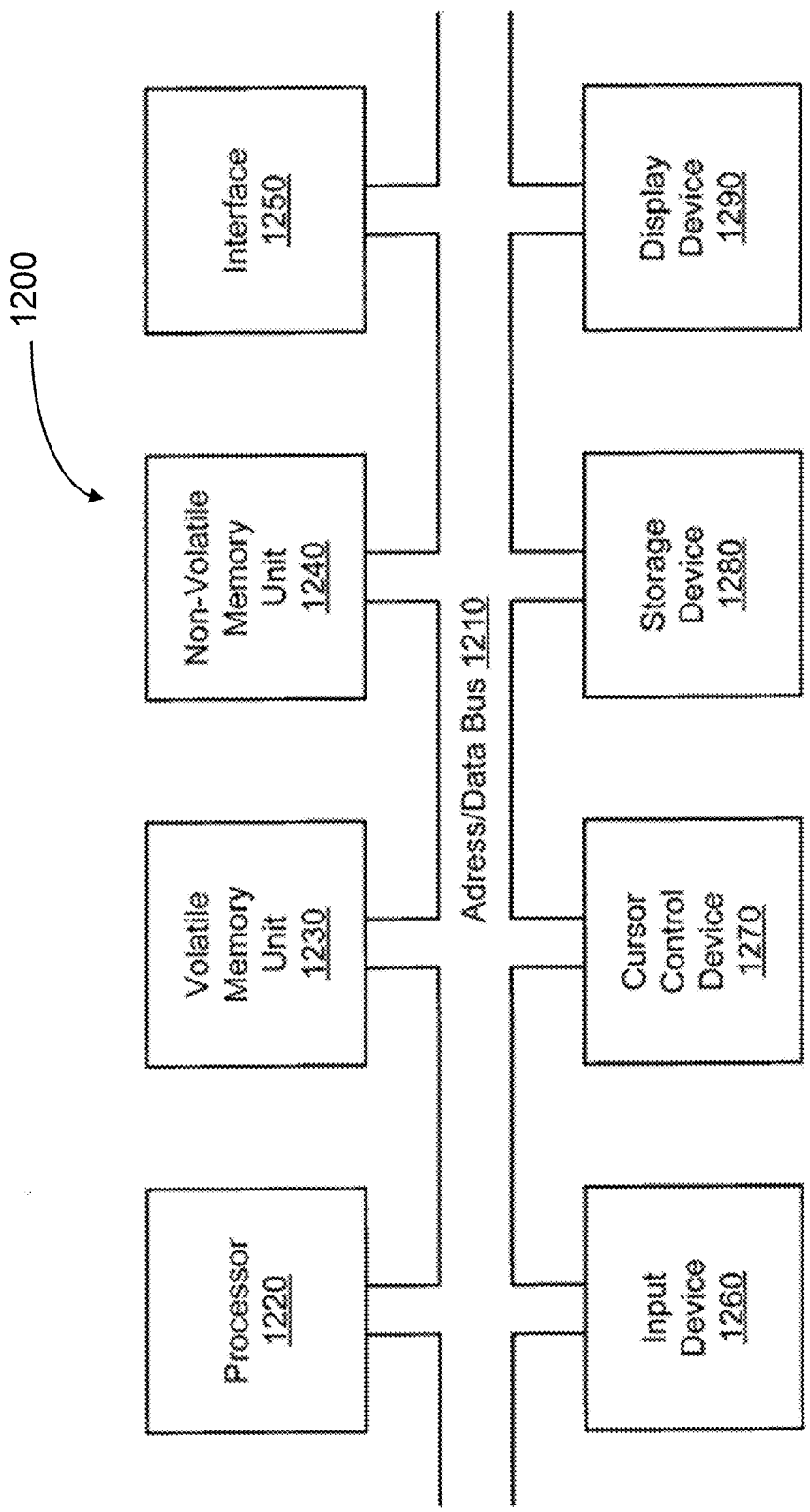
FIG. 7 is a block diagram of a computer in accordance with the present disclosure.

An exemplary computer system 1200 which may be used to perform any of the steps of the described methods is shown in FIG. 7. Exemplary computer system 1200 is configured to perform calculations, processes, operations, and/or functions associated with a module, program or algorithm on the computer system stored in non-transitory memory on the computer system. In one embodiment, certain modules, processes and steps discussed herein are realized as a series of instructions (e.g., software module or program) that reside within computer readable non-transitory memory units and are executed by one or more processors of exemplary computer system 1200. When executed, the instructions cause exemplary computer system 1200 to perform specific actions and exhibit specific behavior, such as described herein.

Exemplary computer system 1200 may include an address/data bus 1210 that is configured to communicate information. Additionally, one or more data processing unit, such as processor 1220, are coupled with address/data bus 1210. Processor 1220 is configured to process information and instructions. In an embodiment, processor 1220 is a microprocessor. Alternatively, processor 1220 may be a different type of processor such as a parallel processor, or a field programmable gate array.

Exemplary computer system 1200 is configured to utilize one or more data storage units. Exemplary computer system 1200 may include a volatile non-transitory memory unit 1230 (e.g., random access memory ("RAM"), static RAM, dynamic RAM, etc.) coupled with address/data bus 1210, wherein volatile non-transitory memory unit 1230 is configured to store information and instructions for processor 1220. Exemplary computer system 1200 further may include a non-volatile non-transitory memory unit 1240 (e.g., read-only memory ("ROM"), programmable ROM ("PROM"), erasable programmable ROM ("EPROM"), electrically erasable programmable ROM "EEPROM"), flash memory, etc.) coupled with address/data bus 1210, wherein non-volatile non-transitory memory unit 1240 is configured to store static information and modules with instructions for processor 1220. Alternatively exemplary computer system 1200 may execute instructions retrieved from an online data storage unit such as in "Cloud" computing. In an embodiment, exemplary computer system 1200 also may include one or more interfaces, such as interface 1250, coupled with address/data bus 1210. The one or more interfaces are configured to enable exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, exemplar computer system 1200 may include an input device 1260 coupled with address/data bus 1210, wherein input device 1260 is configured to communicate information and command selections to processor 1220. In accordance with one embodiment, input device 1260 is an alphanumeric input device, such as a keyboard, that may include alphanumeric and/or function keys. Alternatively, input device 1260 may be an input device other than an alphanumeric input device. In an embodiment, exemplar computer system 1200 may include a cursor control device 1270 coupled with address/data bus 1210, wherein cursor control device 1270 is configured to communicate user input information and/or command selections to processor 1220. In an embodiment, cursor control device 1270 is implemented using a device such as a mouse, a track-ball, a track-pad, an optical tracking device, or a touch screen. The foregoing notwithstanding, in an embodiment, cursor control device 1270 is directed and/or activated via input from input device 1260, such as in response to the use of special keys and key sequence commands associated with input device 1260. In an alternative embodiment, cursor control device 1270 is configured to be directed or guided by voice commands.

In an embodiment, exemplary computer system 1200 further may include one or more optional computer usable data storage devices, such as storage device 1280, coupled with address/data bus 1210. Storage device 1280 is configured to store information and/or computer executable instructions. In one embodiment, storage device 1280 is a non-transitory storage device such as a magnetic or optical disk drive (e.g., hard disk drive ("HDD"), floppy diskette 1300, compact disk read only memory ("CD-ROM") or digital versatile disk ("DVD") 1302, as shown in FIG. 8). Pursuant to one embodiment, a display device 1290 is coupled with address/data bus 1210, wherein display device 1290 is configured to display video and/or graphics. In an embodiment, display device 1290 may include a cathode ray tube ("CRT"), liquid crystal display ("LCD"), field emission display ("FED"), plasma display or any other display device suitable for displaying video and/or graphic images and alphanumeric characters recognizable to a user.

Exemplary computer system 1200 is presented herein as an exemplary computing environment in accordance with an embodiment. However, exemplary computer system 1200 is not strictly limited to being a computer system. For example, an embodiment provides that exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented using computer-executable instructions, such as program modules, being executed by a computer. In one exemplary implementation, such program modules include routines, programs, objects, components and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including non-transitory memory-storage devices.

REFERENCES

The following references have been referred to above and are repeated here for convenience. Each reference is incorporated herein by reference.
[1] J.-M. Frahm, P. Georgel, D. Gallup, T. Johnson, R. Raguram, C. Wu, Y.-H. Jen, E. Dunn, B. Clipp, S. Lazebnik, and M. Pollefeys, "Building Rome on a Cloudless Day," presented at the ECCV, 2010.
[2] A. Miller, V. Jain, and J. L. Mundy, "Real-time rendering and dynamic updating of 3-d volumetric data," in The Fourth Workshop on General Purpose Processing on Graphics Processing Units 2011.
[3] N. Snavely, S. M. Seitz, and R. Szeliski, "Photo Tourism: Exploring image collections in 3D.," in SIGGRAPH, 2006.
[4] D. G. Lowe, "Object recognition from local scale-invariant features," in Seventh IEEE International Conference on Computer Vision, 1999, pp. 1150-1157.
[5] M. A. Fischler and R. C. Bolles, "Random sample consensus: a paradigm for model fitting with applications to image analysis and automated cartography," Communications of the ACM, vol. 24, pp. 381-395, 1981.
[6] K. Levenberg, "A Method for the Solution of Certain Non-Linear Problems in Least Squares," Quarterly of Applied Mathematics vol. 2, pp. 164-168, 1944.
[7] Y. Furukawa, B. Curless, S. M. Seitz, and R. Szeliski, "Towards Internet-scale Multi-view Stereo," presented at the CVPR, 2010.
[8] A. Miller, V. Jain, and J. L. Mundy, "A heterogeneous Framework for Large-Scale Dense 3-d Reconstruction from Aerial Imagery," IEEE Transactions on Parallel and Distributed Systems, vol. IN PRESS, 2013.
[9] M. I. Restrepo, B. A. Mayer, A. O. Ulusoy, and J. L. Mundy, "Characterization of 3-D Volumetric Probabilistic Scenes for Object Recognition," IEEE Journal of Selected Topics in Signal Processing, vol. 6, pp. 522-537, 2012.
[10] B. Clipp, R. Raguram, J.-M. Frahm, G. Welch, and M. Pollefeys, "A Mobile 3D City Reconstruction System," presented at the IEEE VR workshop on Cityscapes, 2008.
[11] C. Wu, B. Clipp, X. Li, J.-M. Frahm, and M. Pollefeys, "3d model matching with viewpointinvariant patches (vip)," in CVPR, 2008.
[12] A. Vedaldi and B. Fulkerson, "VLFeat: An Open and Portable Library of Computer Vision Algorithms," ed, 2008.
[13] Y. Singer and N. Srebro, "Pegasos: Primal estimated sub-gradient solver for SVM," presented at the ICML, 2007.
[14] A. Bosch, A. Zisserman, and X. Munoz, "Image classifcation using random forests and ferns," in ICCV, 2007.
[15] EDISON. Available: http://coewww.rutgers.edu/riul/research/code/EDISON/
[16] D. Comaniciu and P. Meer, "Mean Shift: A Robust Approach Towards Feature Space Analysis," IEEE Transactions on Pattern Analysis and Machine Intelligence, vol. 24, pp. 1-18, 2002.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . . "

What is claimed is:
1. A method for providing classification and segmentation of an image on a computer system comprising:
receiving with a first receiving module on the computer system a two dimensional image having an array of pixels;
receiving a plurality of models with a second receiving module on the computer system, each model having features suitable for classifying each pixel of the image into a respective one of a plurality of categories, wherein each category corresponds to a respective model;
providing a score for each pixel in the image for each category using a classifier module on the computer system, wherein each score for a respective pixel indicates a correspondence of the respective pixel to one of the plurality of categories;
converting each score for each pixel into a probability for each pixel for each category using a conversion module on the computer system, wherein converting each score for each pixel into a probability comprises computing a hyperbolic tangent for each score, adding 1 to the hyperbolic tangent, and dividing by 2;
segmenting the image into image segments using a segmenter module on the computer system, wherein each image segment is a contiguous set of pixels having at least one common feature;
summing for each image segment the probabilities for each pixel in a respective category in a respective image segment to obtain a sum for each image segment for each category using a summing module on the computer system;

dividing each sum by a number of pixels in the respective image segment using a dividing module on the computer system to obtain for each image segment a set of average probabilities, wherein each average probability corresponds to a respective category;

determining for each image segment a most likely category to which the image segment belongs using a determining module on the computer system by determining the maximum average probability out of the set of average probabilities for the image segment;

labeling using a labeling module on the computer system each image segment as being the category corresponding to the most likely category to form a labeled segment image;

identifying any empty areas as incorrect holes in the labeled segment image using an identifying module on the computer system; and filling any empty areas that are identified as incorrect holes using a reconstruction module on the computer system.

2. The method of claim 1 wherein using a classifier to provide a score for each pixel in the image for each category further comprises:

moving a sliding window over the image;

at each position of the sliding window, comparing pixels in the sliding window to features in each model of the plurality of models; and computing a score for the sliding window at each position of the sliding window for each model of the plurality of models.

3. The method of claim 2 further comprising:

if the sliding window is moved one pixel at a time, then assigning the score for each position of the sliding window to a pixel at a center of the sliding window; and if the sliding window is moved more than one pixel at a time, then assigning the score for each position of the sliding window to a set of pixels near a center of the sliding window.

4. The method of claim 1 wherein the classifier comprises:

a VLFeat object categorizer, a KD tree, a Dense Scale-Invariant Feature Transform, a support vector machine, or any combination thereof.

5. The method of claim 1 wherein the segmenter comprises:

a Mean-Shift segmentation method.

6. The method of claim 1 wherein receiving a two dimensional image having an array of pixels comprises:

using a camera, or using an image database.

7. The method of claim 1 wherein receiving a plurality of models comprises:

training a classifier on training patches extracted from images containing target objects.

8. The method of claim 1 wherein receiving a plurality of models comprises:

training a classifier on training patches extracted from images containing target objects;

wherein the training patches are subsets of the images.

9. The method of claim 1 wherein using a classifier to provide a score for each pixel in the image for each category further comprises:

converting an image from red, green, blue (RGB) to L*a*b space.

10. The method of claim 1 wherein filling any empty areas that are identified as incorrect holes comprises:

projecting a plane over the hole and overlaying the plane with an image similar to a surrounding area, or filling the hole using a probabilistic voxel method.

11. The method of claim 1 wherein providing a score for each pixel for each category comprises deriving a dot product that reflects a distance from a separating hyper plane for each category.

12. A method of forming a three dimensional model on a computer system comprising:

receiving a plurality of two dimensional images using a first receiving module on the computer system, each two dimensional image having an array of pixels and being from a respective pose of a target object;

receiving a plurality of models using a second receiving module on the computer system, each model having features suitable for classifying each pixel of each two dimensional image into a respective one of a plurality of categories, wherein each category corresponds to a respective model;

for each two dimensional image:

using a classifier module on the computer system to provide a score for each pixel in the image for each category, wherein each score for a respective pixel indicates a correspondence of the respective pixel to one of the plurality of categories;

converting each score for each pixel into a probability for each pixel for each category using a conversion module on the computer system, wherein converting each score for each pixel into a probability comprises computing a hyperbolic tangent for each score, adding 1 to the hyperbolic tangent, and dividing by 2;

using a segmenter module on the computer system to segment the image into image segments, wherein each image segment is a contiguous set of pixels having at least one common feature;

summing for each image segment using a summer module on the computer system the probabilities for each pixel in a respective category in the respective image segment to obtain a sum for each image segment for each category;

dividing using a divider module on the computer system each sum by a number of pixels in the respective image segment to obtain for each image segment a set of average probabilities using a divider module on the computer system, wherein each average probability corresponds to a respective category;

determining using a determining module on the computer system for each image segment a most likely category to which the image segment belongs by determining the maximum average probability out of the set of average probabilities for the image segment; and labeling using a labeling module on the computer system each image segment as being the category corresponding to the most likely category to form a labeled segment image; and forming the three dimensional model from the two dimensional images using a three dimension modeling module on the computer system.

13. The method of claim 12 wherein using a classifier to provide a score for each pixel in the image for each category further comprises:

moving a sliding window over the image;

at each position of the sliding window, comparing pixels in the sliding window to features in each model of the plurality of models; and computing a score for the sliding window at each position of the sliding window for each model of the plurality of models.

14. The method of claim 13 further comprising:
if the sliding window is moved one pixel at a time, then assigning the score for each position of the sliding window to a pixel at a center of the sliding window; and
if the sliding window is moved more than one pixel at a time, then assigning the score for each position of the sliding window to a set of pixels near a center of the sliding window.

15. The method of claim 12 wherein using the classifier comprises:
using a VLFeat object categorizer, using a KD tree, using a Dense Scale-Invariant Feature Transform, extracting a pyramid histogram of visual words, using a support vector machine, or any combination thereof.

16. The method of claim 12 wherein the segmenter comprises:
a Mean-Shift segmentation method.

17. The method of claim 12 wherein forming the three dimensional model further comprises:
using a Shape-from-Motion (SFM) method;
extracting Scale Invariant Feature Transform (SIFT) features;
using model fitting;
using a gradient method;
using a probabilistic voxel method; or
using surface mapping; or
any combination thereof.

18. The method of claim 12 wherein receiving a two dimensional image having an array of pixels comprises:
using a camera, or using an image database.

19. The method of claim 12 wherein using a classifier to provide a score for each pixel in the image for each category further comprises:
converting an image from red, green, blue (RGB) to L*a*b space.

20. The method of claim 12 wherein providing a score for each pixel for each category comprises deriving a dot product that reflects a distance from a separating hyper plane for each category.

21. A computer system for providing classification and segmentation of an image comprising:
a first receiving module on the computer system for receiving a two dimensional image having an array of pixels;
a second receiving module on the computer system for receiving a plurality of models, each model having features suitable for classifying each pixel of the image into a respective one of a plurality of categories, wherein each category corresponds to a respective model;
a classifier module on the computer system for providing a score for each pixel in the image for each category, wherein each score for a respective pixel indicates a correspondence of the respective pixel to one of the plurality of categories,
a conversion module on the computer system for converting each score for each pixel into a probability for each pixel for each category, wherein converting each score for each pixel into a probability comprises computing a hyperbolic tangent for each score, adding 1 to the hyperbolic tangent, and dividing by 2;
a segmenter module on the computer system for segmenting the image into image segments, wherein each image segment is a contiguous set of pixels having at least one common feature;
a summing module on the computer system for summing for each image segment the probabilities for each pixel in a respective category in a respective image segment to obtain a sum for each image segment for each category;
a dividing module on the computer system for dividing each sum by a number of pixels in the respective image segment to obtain for each image segment a set of average probabilities, wherein each average probability corresponds to a respective category;
a determining module on the computer system for determining for each image segment a most likely category to which the image segment belongs by determining the maximum average probability out of the set of average probabilities for the image segment;
a labeling module on the computer system for labeling each image segment as being the category corresponding to the most likely category to form a labeled segment image;
an identifying module on the computer system for identifying any empty areas as incorrect holes in the labeled segment image; and
a reconstruction module on the computer system for filling any empty areas that are identified as incorrect holes.

22. The computer system of claim 21 wherein the classifier module comprises modules on the computer system for:
moving a sliding window over the image;
at each position of the sliding window, comparing pixels in the sliding window to features in each model of the plurality of models;
computing a score for the sliding window at each position of the sliding window for each model of the plurality of models; and
if the sliding window is moved one pixel at a time, then assigning the score for each position of the sliding window to a pixel at a center of the sliding window; and
if the sliding window is moved more than one pixel at a time, then assigning the score for each position of the sliding window to a set of pixels near a center of the sliding window.

23. The computer system of claim 21 wherein the classifier module comprises:
a VLFeat object categorizer, a KD tree, a Dense Scale-Invariant Feature Transform, a support vector machine, or any combination thereof.

24. The computer system of claim 21 wherein the segmenter modules comprises:
a Mean-Shift segmentation module.

25. The computer system of claim 21 wherein the reconstruction module comprises a module to:
project a plane over the hole and overlaying the plane with an image similar to a surrounding area, or to fill the hole using a probabilistic voxel method.

26. The computer system of claim 21 wherein providing a score for each pixel for each category comprises deriving a dot product that reflects a distance from a separating hyper plane for each category.

27. A computer system for forming a three dimensional model on a computer system comprising:
a first receiving module on the computer system for receiving a plurality of two dimensional images, each two dimensional image having an array of pixels and being from a respective pose of a target object;

a second receiving module on the computer system for receiving a plurality of models, each model having features suitable for classifying each pixel of each two dimensional image into a respective one of a plurality of categories, wherein each category corresponds to a respective model;

a classifier module on the computer system to provide a score for each pixel in each image for each category, wherein each score for a respective pixel indicates a correspondence of the respective pixel to one of the plurality of categories;

a conversion module on the computer system for converting each score for each pixel into a probability for each pixel for each category, wherein converting each score for each pixel into a probability comprises computing a hyperbolic tangent for each score, adding 1 to the hyperbolic tangent, and dividing by 2;

a segmenter module on the computer system for segmenting the image into image segments, wherein each image segment is a contiguous set of pixels having at least one common feature;

a summer module on the computer system for summing for each image segment the probabilities for each pixel in a respective category in the respective image segment to obtain a sum for each image segment for each category;

a divider module on the computer system for dividing each sum by a number of pixels in the respective image segment to obtain for each image segment a set of average probabilities, wherein each average probability corresponds to a respective category;

a determining module on the computer system for determining for each image segment a most likely category to which the image segment belongs by determining the maximum average probability out of the set of average probabilities for the image segment;

a labeling module on the computer system for labeling each image segment as being the category corresponding to the most likely category to form a labeled segment image; and a three dimension modeling module on the computer system for forming the three dimensional model from the two dimensional images.

28. The computer system of claim 27 wherein the classifier module comprises modules on the computer system for:

moving a sliding window over the image;

at each position of the sliding window, comparing pixels in the sliding window to features in each model of the plurality of models;

computing a score for the sliding window at each position of the sliding window for each model of the plurality of models; and if the sliding window is moved one pixel at a time, then assigning the score for each position of the sliding window to a pixel at a center of the sliding window; and if the sliding window is moved more than one pixel at a time, then assigning the score for each position of the sliding window to a set of pixels near a center of the sliding window.

29. The computer system of claim 27 wherein the classifier module comprises:

a VLFeat object categorizer, a KD tree, a Dense Scale-Invariant Feature Transform, extracting a pyramid histogram of visual words, a support vector machine, or any combination thereof.

30. The computer system of claim 27 wherein the segmenter modules comprises:

a Mean-Shift segmentation module.

31. The computer system of claim 27 wherein the three dimension modeling module further comprises modules on the computer system for:

applying a Shape-from-Motion (SFM) method;

extracting Scale Invariant Feature Transform (SIFT) features;

using model fitting;

using a gradient method;

using a probabilistic voxel method; or using surface mapping; or any combination thereof.

32. The computer system of claim 27 wherein providing a score for each pixel for each category comprises deriving a dot product that reflects a distance from a separating hyper plane for each category.

* * * * *